US006198740B1

(12) United States Patent
Kim

(10) Patent No.: US 6,198,740 B1
(45) Date of Patent: Mar. 6, 2001

(54) TECHNIQUE FOR DISTRIBUTING HIGHWAYS IN EXCHANGE

(75) Inventor: Hong-Myung Kim, Songnam (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/134,441

(22) Filed: Aug. 14, 1998

(30) Foreign Application Priority Data

Sep. 30, 1997 (KR) ..................................... 97-50514

(51) Int. Cl.[7] .......................... H04Q 11/00; H04L 12/50

(52) U.S. Cl. ..................... 370/375; 370/437; 340/825.03

(58) Field of Search .................................. 370/422, 423, 370/433, 434, 357, 359, 377, 378, 379, 386, 437, 438, 465, 468; 340/825, 825.03

(56) References Cited

U.S. PATENT DOCUMENTS 4,140,877 2/1979 Joslow et al. .
4,317,961 * 3/1982 Johnson ............................ 370/422
4,674,083 6/1987 Rackin .
4,694,452 9/1987 Beckinger et al. .
4,736,409 4/1988 Hasegawa et al. .
4,769,294 9/1988 Nakagawara .
5,151,896 9/1992 Bowman et al. .
5,161,155 11/1992 Dyer et al. .
5,581,553 12/1996 Cave et al. .
5,682,385 10/1997 Garcia et al. .
5,884,162 * 3/1999 Yamazaki et al. .................. 455/416

FOREIGN PATENT DOCUMENTS 5030561 2/1993 (JP) .

* cited by examiner

*Primary Examiner*—Ricky Ngo
(74) *Attorney, Agent, or Firm*—Robert E. Bushnell, Esq.

(57) ABSTRACT

A technique for distributing highways to a plurality of line cards in an exchange includes: a highway selector for distributing highways necessary for the line cards; and a controller for receiving card information from the line cards, and controlling the highway selector so as to distribute a specific highway to a specific line card.

10 Claims, 7 Drawing Sheets

| Highway No. | RX | TX | Remark |
|---|---|---|---|
| Highway 0 | DTMFR ; 4<br>Rate Adapter ; 2<br>4SW or<br>3CID or 4R2 ; 24max<br>Paging of CCP ; 1<br>Paging of APT ; 1<br>Reserved ; 0 | Rate Adapter;2<br>Music of CCP;1<br>Music of APT;<br>Internal ; 1<br>Internal/External;1<br>Reserved ; 27 | CCP<br>APT |
| Highway 1 | DTMFR ; 16<br>4SW or 3CID or<br>4R2 ; 24max<br>Reserved ; 0 | Reserved ; 32 | APT |
| Highway 2–7 | Line card | Line card | Universal Slot |
| Highway 8 | DTMFR ; 4<br>4SW or<br>3CID or 4R2;24max<br>Reserved ; 4 | Reserved 32 | ECP |
| Highway 9 | Conference | Conference | CCP |
| Highway 10–15 | Line Card | Line Card | Universal Slot |

FIG. 3

TECHNIQUE FOR DISTRIBUTING HIGHWAYS IN EXCHANGE

CLAIM OF PRIORITY

This application makes reference to, incorporates the same herein, and claims all benefits accruing under 35 U.S.C. §119 from an application for APPARATUS AND METHOD FOR DISTRIBUTING HIGHWAY IN EXCHANGE earlier filed in the Korean Industrial Property Office on Sep. 30, 1997 and there duly assigned Serial No. 50514/1997.

BACKGROUND OF THE INVENTION

1. Field of the Invention

The present invention relates to highways of a PBX (private branch exchange), and more particularly, to a technique for distributing highways to subscriber cards of a PBX.

2. Description of the Related Art

In general, a PBX is contained within a cabinet. The cabinet has a plurality of shelves therein. Cards for performing various switching functions demanded from the exchange are inserted into respective slots of these shelves. For instance, a card including a circuit for switching a subscriber signal is installed on a control shelf of the exchange, and a card including a circuit for accommodating subscribers is installed on a line shelf. A highway cable is connected between the control shelf and the line shelf.

Typically, one highway is comprised of 32 channels each having 8 bits and synchronized with a frame synchronization of 8 KHz. Therefore, a PCM (Pulse Code Modulation) data speed of one highway is 2.048 MHZ (=8 KHZ*8 bits*32 channels). A time switch, which is a PCM switch, uses 8 highways generally, and therefore, it has 256 channels (=32 channels*8).

In an earlier highway distribution apparatus in a private branch exchange, a time switch has 8 highways HW1, . . . , HW8. 16 line cards each have 16 channels and interfacing with the exterior. One highway is connected to two line cards each having 16 channels.

According to the number of channels, the line card is classified into a 32-SLI (Single Line Interface Card) using 32 channels, a 16-SLI using 16 channels and an 8-SLI using 8 channels. One highway may be fixedly connected to 2 16-SLIs. However, if the 8-SLI or 32-SLI is actually used, operation may be impossible or the highway channel may bring about a loss. In other words, assuming that the time switch is set to 16 channels per line card, operation is impossible in an ISDN (Integrated Services Digital Network) or an ATM (Asynchronous Transfer Mode) because it needs 64 channels, and there is loss of channels in the 8-SLI. Moreover, if the line card requires 32 channels, only one of two line cards to which one highway is supplied is used, and the other line card can not be used.

The following patents each discloses features in common with the present invention but do not teach or suggest the specific technique for distributing highways in an exchange in accordance with the present invention: U.S. Pat. No. 4,796,294 to Nakagawara, entitled Electioonic Telephone Exchange And Method Of Connecting Ports Of The Exchange, U.S. Pat. No. 4,736,409 to Hasegawa et al, entitled Control Data Transmission Systems For Private Branch Exchange, U.S. Pat. No. 4,674,083 to Rachkin, entitled Time Division Multiplexed Switching Structure For PBX, U.S. Pat. No. 4,140,877 to Joslow et al., entitled Multiple Highway Time Division Multiplexed PABX Communication System, U.S. Pat. No. 5,161,155 to Dyer et al., entitled Automatic Telecommunications Systems, U.S. Pat. No. 4,694,452 to Beckinger et al., entitled Switching Configuration For A Telecommunications System In particular A PBX System With Subscriber Lines, Trunk Groups, And Interface Modules, U.S. Pat. No. 5,151,896 to Bowman et al., entitled Modular Digital Telephlone System With Fully Distributed Local Switching And Control, U.S. Pat. No. 5,682,385 to Garcia et al., entitled Enhancement For A Multiplexing Telecommunications Interface, and U.S. Pat. No. 5,581,553 to Cave et al., entitled Distributed Switching Architecture.

SUMMARY OF THE INVENTION

It is therefore an object of the present invention to provide a technique for efficiently distributing highways necessary for line cards in an exchange.

In one aspect of the present invention, there is provided an apparatus for distributing highways to a plurality of line cards in an exchange, comprising: a highway selector for distributing highways necessary for the line cards; and a controller for receiving card information from the line cards, and controlling the highway selector so as to distribute a specific highway to a specific line card.

In another aspect of the present invention, a method for distributing highways to a plurality of line cards by using a highway selector in an exchange, comprises the steps of: reading out card information from the line cards to detect highway channel information; and distributing the highways using the highway selector according to the detected channel information so as to distribute a specific highway to a specific line card.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows highways supplied to each rack of the cabinet of FIG. 2;

DETAILED DESCRIPTION OF THE PREFERRED EMBODIMENT

Figure 1:
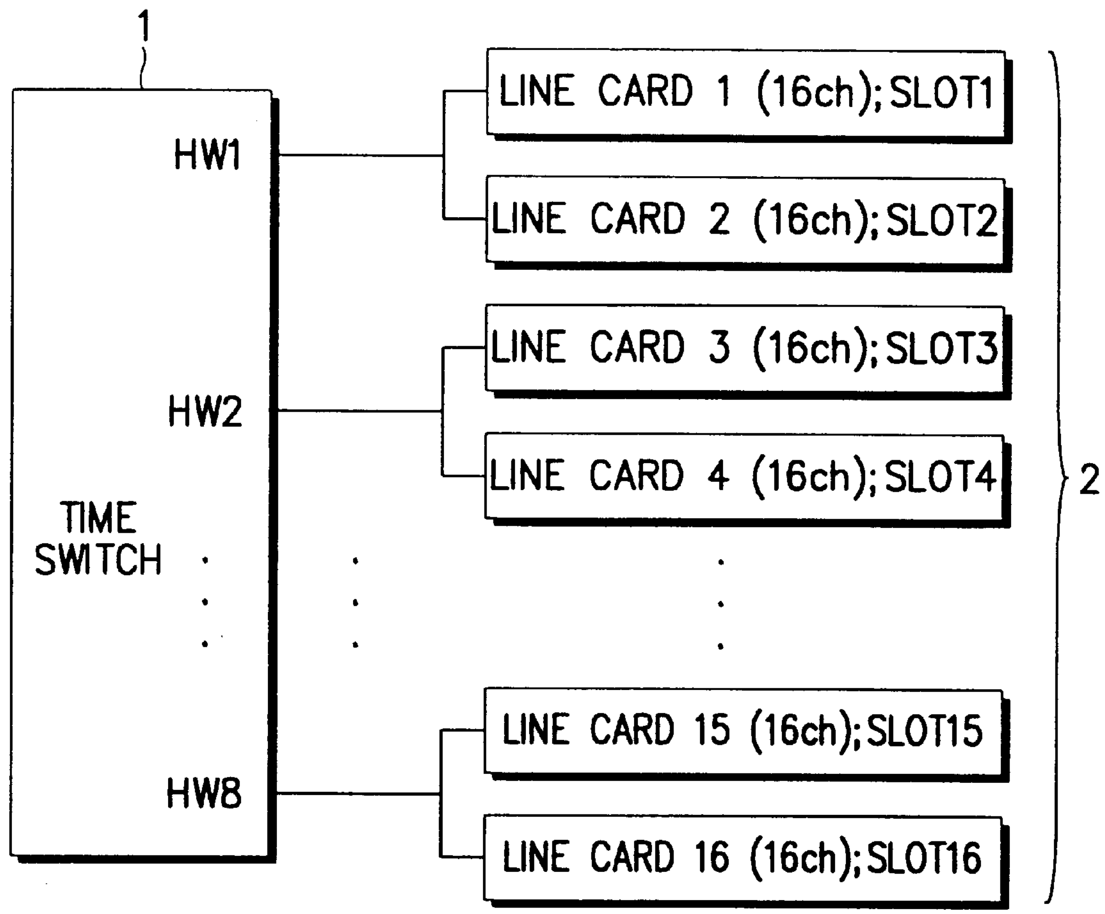
FIG. 1 shows an earlier highway distribution apparatus in an exchange.

The descriptions of various configurations and components of the present invention which would have been known to one skilled in the art have been omitted for the sake of clarity and brevity. Also, in the figures, similar reference numerals or symbols designate similar elements.

FIG. 1 illustrates the earlier highway distribution apparatus discussed in detail in the Description of the Related Art above.

A time switch 1 has 8 highways. There are 16 line cards 2, each having 16 channels and interfacing with the exterior. One highway is connected to two line cards, each having 16 channels.

Figure 2:
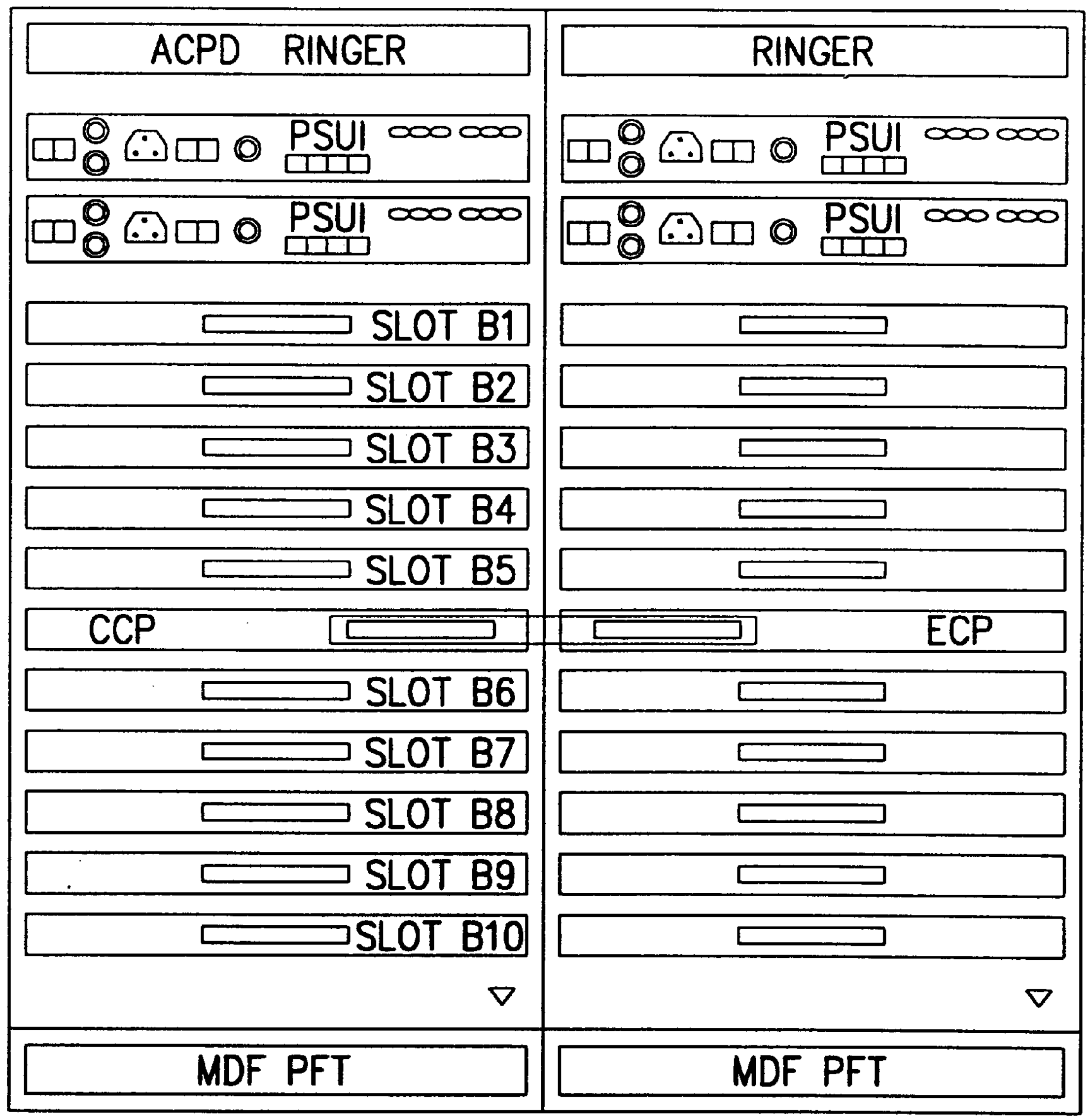
FIG. 2 shows a cabinet of an exchange according to the present invention.

Referring to FIG. 2, there is shown a cabinet of an exchange. The cabinet has two racks each having a plurality of line cards SLOT B1, . . . , SLOT B10.

FIG. 3 shows highways supplied to each rack of the cabinet of FIG. 2. Highways with numbers 2, . . . , 7 and 10, . . . , 15 are respectively supplied to two racks. Therefore, each rack distributes 6 highways to 10 line cards.

Figure 4:
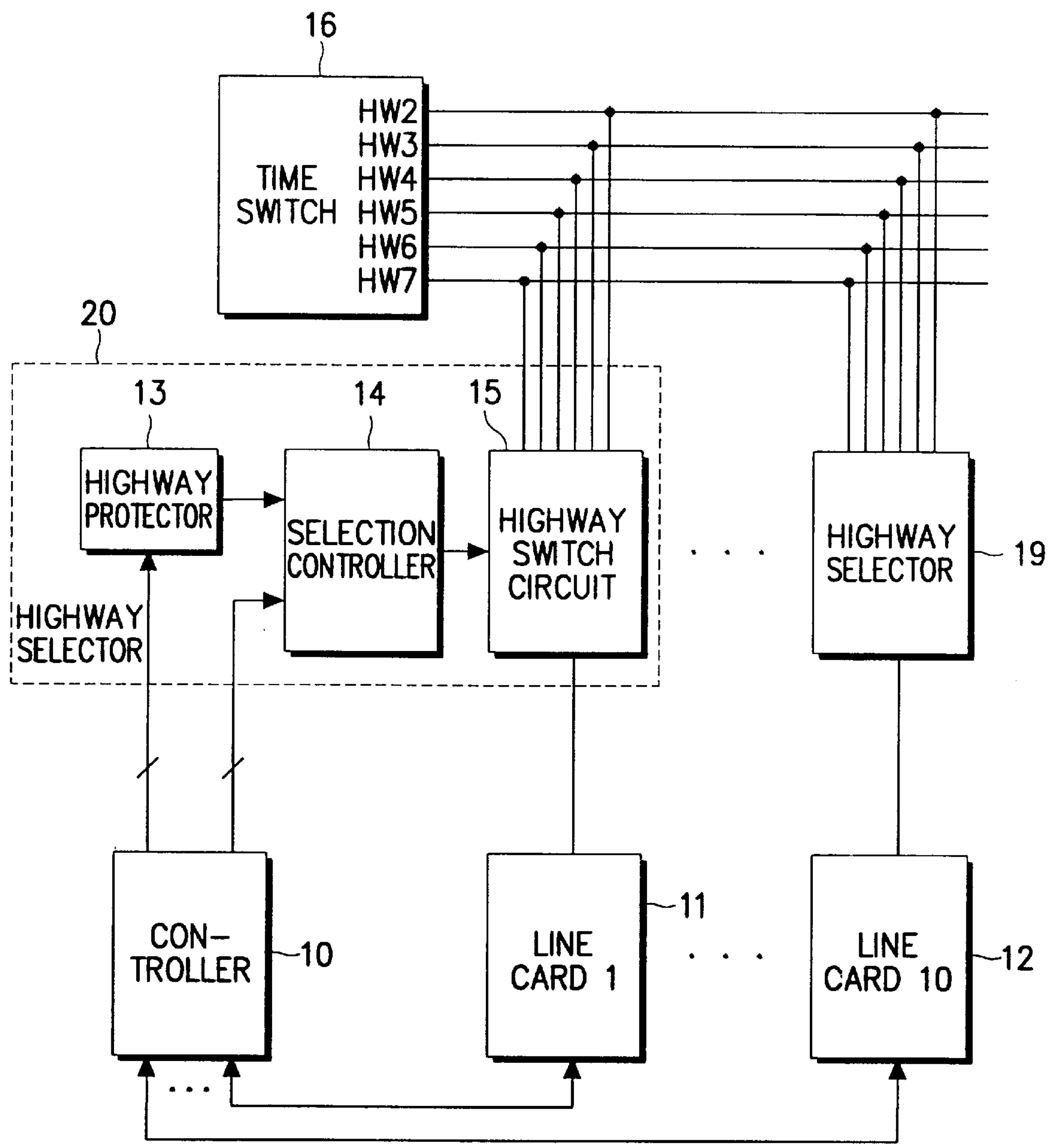
FIG. 4 shows a highway distribution apparatus according to the present invention.

Referring to FIG. 4, a highway distribution apparatus includes a time switch 16 having 6 highways, line cards 11, . . . , 12 having card information including highway channel information, highway selectors 20, . . . , 19, and a controller 10. The controller 10 reads out the card information from the line cards 11, . . . , 12 and controls the highway selector 20 to distribute the highways. The controller 10, which is a controller of a system, corresponds to a CCP and an ECP shown in FIG. 2. The highway selector 20 connected between the time switch 16 and the line card 11 distributes the highways under the control of the controller 10. The highway selector 20 includes a highway protector 13, a selection controller 14, and a highway switch circuit 15. The highway protector 13 generates an enable signal for enabling the selection controller 14 under the control of the controller 10. The selection controller 14 receives the enable signal from the highway protector 13 and controls the highway switch circuit 15 under the control of the controller 10 to distribute the highways.

Figure 5:
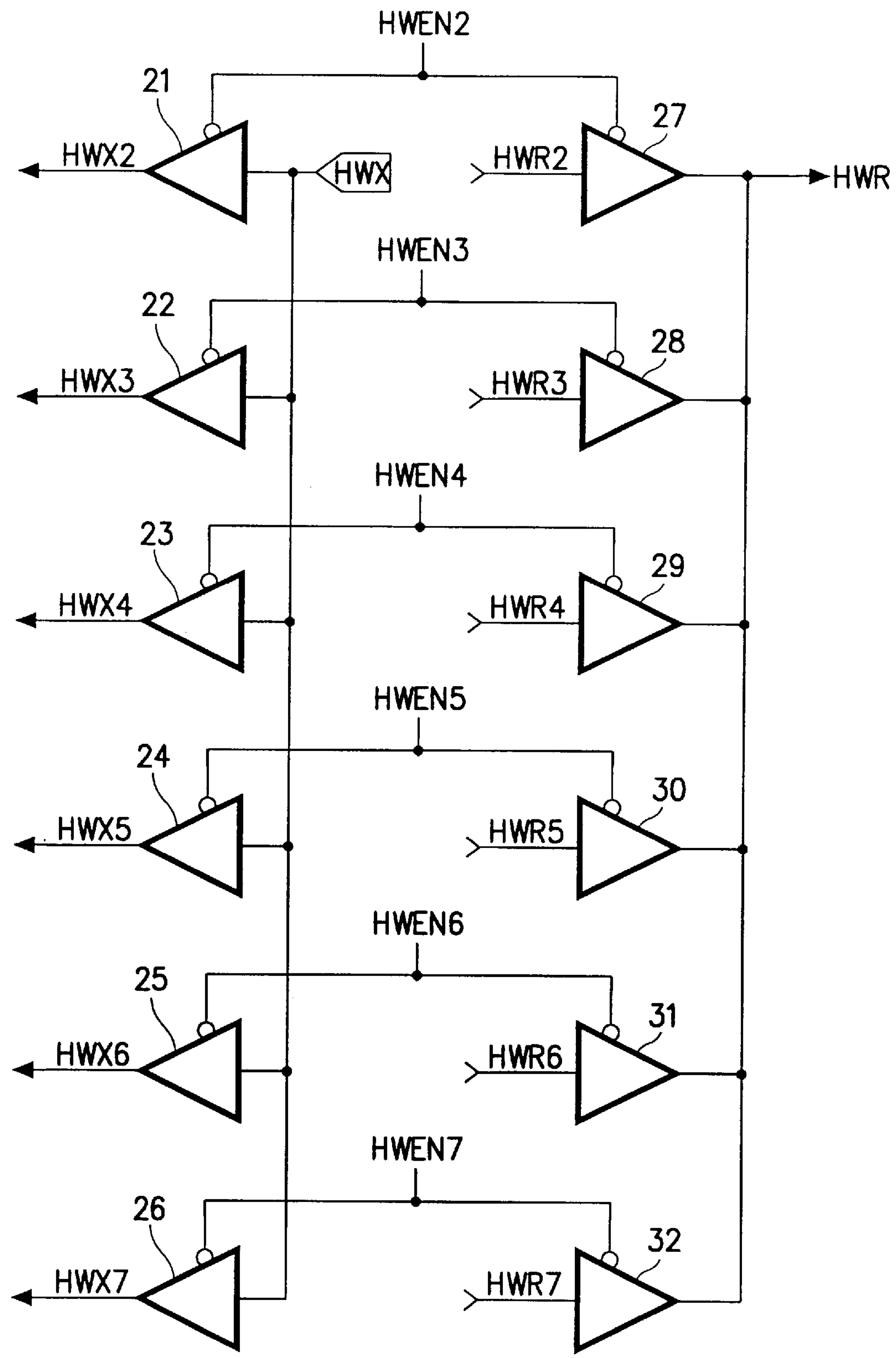
FIG. 5 is a detailed circuit diagram of a highway switch circuit indicated in FIG. 4.

FIG. 5 is a detailed circuit diagram of the highway switch circuit 15 shown in FIG. 4. Transmitting buffers 21, . . . , 26 connects the highways to the line cards. Receiving buffers 27, . . . , 32 connects the highways to the line cards. Each of the transmitting and receiving buffers 21, . . . , 26 and 27, . . . , 32 operate by a highway enable signal HWEN generated by the selection controller 14, and may each use a 74HC125 buffer element.

Figure 6:
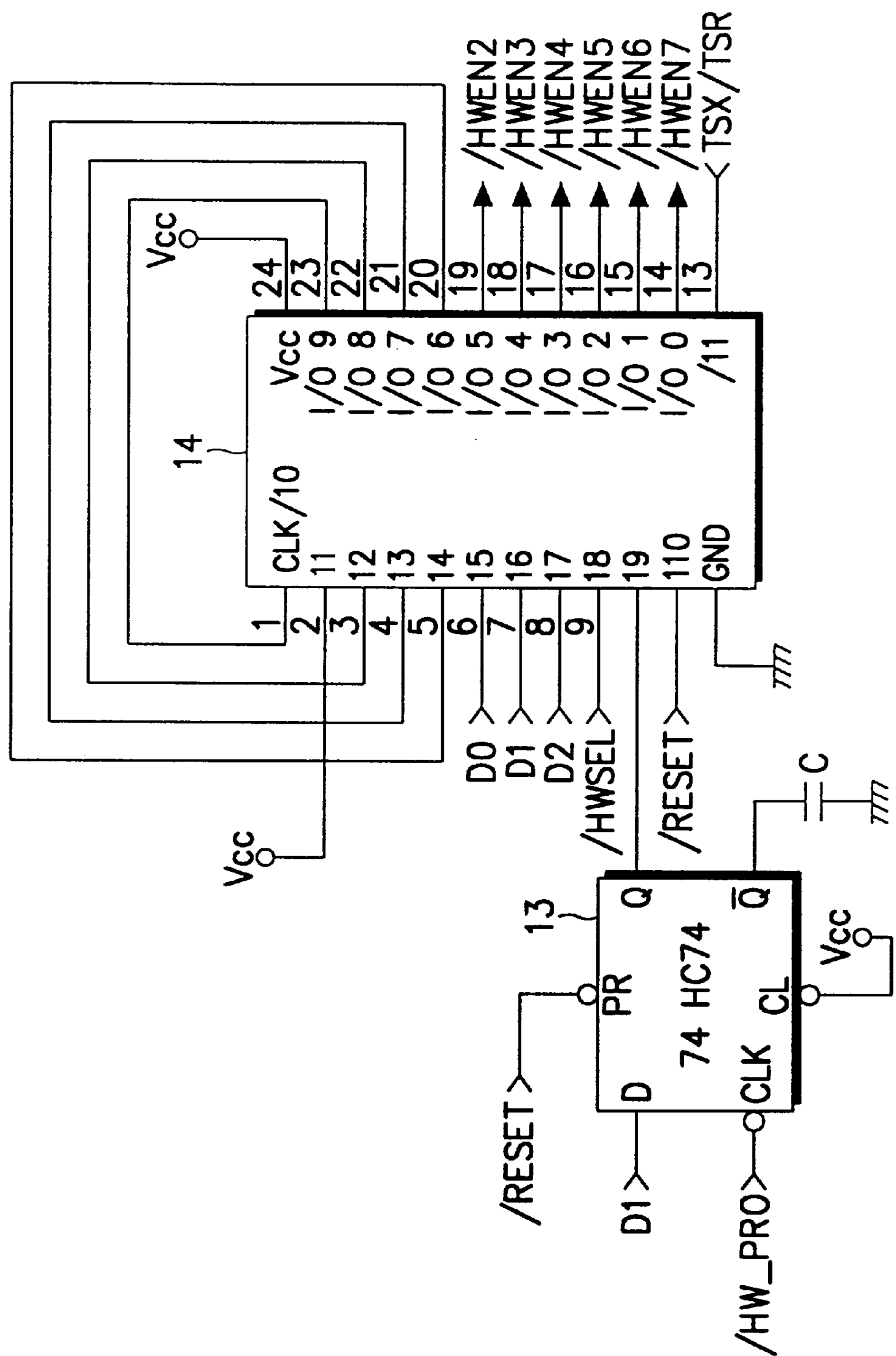
FIG. 6 shows a highway protector and a select controller indicated in FIG. 4.

FIG. 6 shows the highway protector 13 and the selection controller 14 indicated in FIG. 4. The highway protector 13, using a 74HC74 flip-flop, receives control signals D1 and HW_PRO from the controller 10 and generates an enable signal for enabling the selection controller 14. The selection controller 14 operates by the enable signal generated by the highway protector 13. The selection controller 14 receives control signals D0, D1, D2 and /HWSET for selecting the highway and a signal TSX/TSR for selecting the channel from the controller 10 and sends the channel-allocated highway enable signal HWEN to the highway switch circuit 15. Then the highway switch circuit 15 opens a corresponding buffer to connect the highway to a corresponding line card. The selection controller 14 generates a corresponding address map by using GAL.

Figure 7:
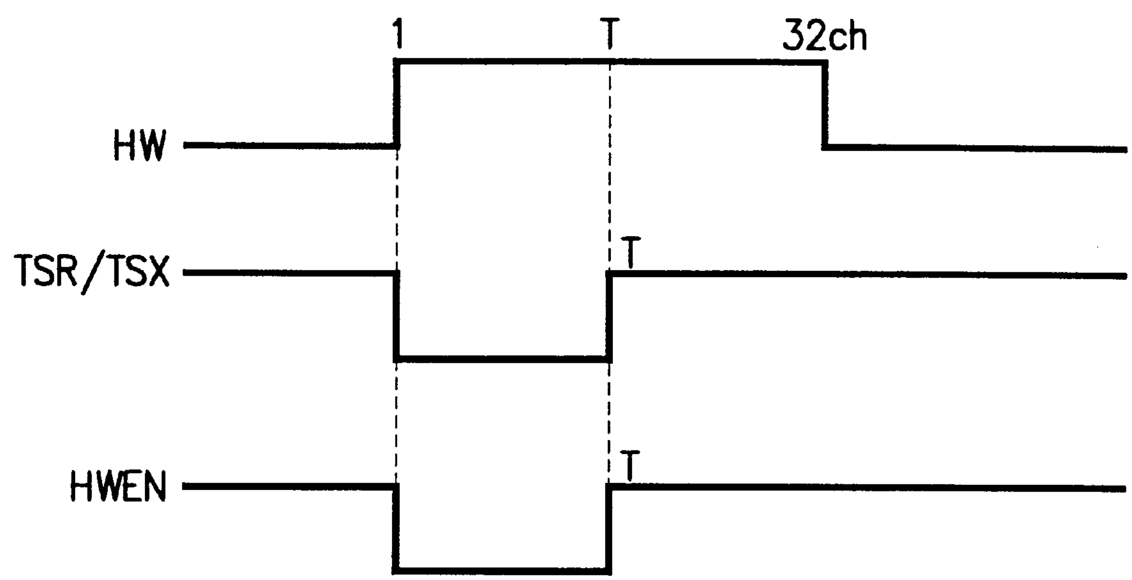
FIG. 7 shows a highway enable signal generated by the select controller illustrated in FIG. 6.

FIG. 7 shows the highway enable signal generated by the selection controller 14 illustrated in FIG. 6. A highway (HW) uses 32 channels. In order to connect the highway of corresponding channels (T channels) to the line card, the selection controller 14 receives the signal TSX/TSR for selecting the channel from the controller 10 and generates the highway enable signal HWEN.

As described above, the highway selector is used to distribute the highway in the exchange. The line card can select the highways irrespective of their number, and one highway can be used for multiple line cards.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. In an apparatus for distributing highways to a plurality of line cards in an exchange, said apparatus comprising:

- a highway selector for distributing highways necessary for said line cards, said selector comprising:
  - a highway switch circuit for connecting a specific highway to a specific line card;
  - a select controller for supplying a highway select signal to said highway switch circuit; and
  - a highway protector for enabling said select controller under the control of said controller; and
- a controller for receiving card information from said line cards, and controlling said highway selector so as to associate highways and line cards;

the improvement comprising:

said apparatus comprising a means for distributing highways without a limitation according to their number and for allocating a single highway to a plurality of line cards.

2. The apparatus as claimed in claim 1, said highway protector comprising a D flip-flop.

3. The apparatus as claimed in claim 1, said highway switch circuit comprising:

- transmitting buffers having respective input terminals connected to a transmitting highway of said line card and having respective output terminals connected to said highways, said transmitting buffers operating by said highway select signal from said select controller; and
- receiving buffers having respective output terminals connected to a receiving highway of said line card and having respective input terminals connected to said highways, said receiving buffers operating by said highway select signal from said select controller.

4. In a method of distributing highways to a plurality of line cards using a highway selector in an exchange, said method comprising the steps of:

(1) reading out card information from said line cards to detect highway channel information; and (2) distributing the highways using said highway selector according to the detected channel information so as to associate highways and line cards;

the improvement comprising providing the highway selector with a means for distributing highways without a limitation in accordance with their number and for allocating a single highway to a plurality of line cards.

5. The apparatus of claim 1, wherein the highway protector is adapted to generate an enable signal in response to a control signal from the controller, said enable signal enabling the selection controller to select a selected highway and a selected channel, and to send to the highway switch circuit a highway-enable signal responsive to said selection of a selected highway and a selected channel, thereby causing the highway switch circuit to connect the selected highway to a corresponding line card.

6. The apparatus of claim 5, wherein the highway switch circuit connects the selected highway to a corresponding line card by opening a corresponding buffer.

7. The method of claim 4, wherein the highway selector is adapted to distribute highways without a limitation according to their number and to allocate a single highway to a plurality of line cards by causing the highway protector to generate an enable signal in response to a control signal from the controller, said enable signal enabling the selection controller to select a selected highway and a selected channel, and to send to the highway switch circuit a highway-enable signal responsive to said selection of a selected highway and a selected channel, thereby causing the highway switch circuit to connect the selected highway to a corresponding line card.

8. The method of claim 7, wherein the highway switch circuit connects the selected highway to a corresponding line card by opening a corresponding buffer.

9. A method for distributing highways without a limitation according to their number and for allocating a single highway to a plurality of line cards, in an apparatus for distributing highways to a plurality of line cards in an exchange, said apparatus comprising:

a highway selector for distributing highways necessary for said line cards, said selector comprising:

a highway switch circuit for connecting a specific highway to a specific line card;

a select controller for supplying a highway select signal to said highway switch circuit; and a highway protector for enabling said select controller under the control of said controller; and a controller for receiving card information from said line cards, and controlling said highway selector so as to associate highways and line cards;

said method comprising the steps of:

(1) adapting the highway selector to cause the highway protector to generate an enable signal in response to a control signal from the controller;

(2) using said enable signal to enable the selection controller to select a selected highway and a selected channel, and to send to the highway switch circuit a highway-enable signal responsive to said selection of a selected highway and a selected channel; and (3) causing the highway switch circuit to connect the selected highway to a corresponding line card.

10. The method of claim 9, wherein the highway switch circuit connects the selected highway to a corresponding line card by opening a corresponding buffer.

* * * * *